3,165,519
Patented Jan. 12, 1965

3,165,519
NEW QUINAZOLINES
Joseph Patrick Brown, Llangollen, Wales, assignor to Monsanto Chemicals Limited, London, England, a British company
No Drawing. Filed Apr. 5, 1961, Ser. No. 100,826
Claims priority, application Great Britain Apr. 21, 1960
8 Claims. (Cl. 260—256.4)

This invention relates to quinazolines, particularly for instance to 2-guanidinoquinazolines and their salts.

In British specifications Nos. 13,706/59 and 40,154/59, which were combined and filed in the United States as application Serial No. 21,124, and now abandoned, there are described 2-guanidinoquinazolines and their salts which have biocidal (including bacteriostatic) activity, as well as processes for their preparation by reaction of a salt of a 2,2-dialkyl-1,2-dihydroquinoline with dicyandiamide or a dicyandiamide derivative.

It has now been found that when a salt of a 2,2-dialkyl-1,2-dihydroquinoline is reacted with a compound having two $N_3$-cyano-$N_1$-guanidino groups linked by an aliphatic residue, there is obtained a biocidal product that is a compound having two $N_3$-(quinazolin-2-yl)-$N_1$-guanidino groups connected by the aliphatic residue. An olefin, whose identity depends on the nature of the 2,2-dialkyl groups of the dihydroquinoline, is produced in the reaction as a by-product.

The process of the present invention is accordingly one for the production of a compound having two $N_3$-(quinazolin-2-yl)-$N_1$-guanidino groups linked by an aliphatic residue, in which a salt of a 2,2-dialkyl-1,2-dihydroquinoline is reacted with a compound having two $N_3$-cyano-$N_1$-guanidino groups linked by an aliphatic residue.

Reaction of a suit of a 2,2-dialkyl-1,2-dihydroquinoline with dicyandiamide or a derivative normally results in a salt, and where the free amine product is desired this (or sometimes a basic salt) can be obtained by treatment of the salt with a base.

The process of the invention is exemplified by the reaction between 2,2,4-trimethyl-1,2-dihydroquinoline hydrochloride and 1,6-di($N_3$-cyano-$N_1$-guanidino)hexane to form the biocidal product di[$N_3$-(4-methylquinazolin-2-yl)-$N_1$-guanidino]hexane, as represented by the following equation:

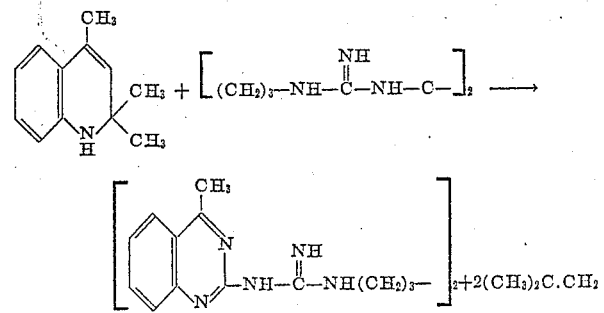

Compounds having two $N_3$-(quinazolin-2-yl)-$N_1$-guanidino groups linked by an aliphatic residue and their salts are new compounds and are part of the invention.

The 2,2-dialkyl-1,2-dihydroquinoline can be substituted in the benzene ring, for example by an alkyl group, an alkoxy group, an aralkyl group, a hydroxyl group, a nitro group, an amino group (including an N-alkylamnio group), a halogen atom or an aromatic group. When the substituent is an alkyl group (and this also applies in respect of the alkyl component of the alkoxy group) this can be acyclic (primary, secondary or tertiary, and branched or unbranched), or cyclic, and can be a lower alkyl group, that is one containing up to 4 carbon atoms, or a higher alkyl group. Specific alkyl groups are methyl, ethyl, n-propyl, isopropyl, n-butyl, isobutyl and tert.-butyl groups; an octyl group; a dodecyl group (for example one derived from propylene tetramer); and cyclohexyl and methylcyclohexyl groups. Suitable aralkyl groups are for instance the benzyl or methyl benzyl group. Suitable halogen atoms are chlorine, bromine or iodine. When the benzene ring is substituted by an aromatic group this can be for example a phenyl group or a substituted phenyl group such as a p-chlorophenyl group. The heterocyclic ring of the dihydroquinoline can also be substituted in the 4-position, for example by an alkyl or cycloalkyl group as described above.

The compound having two $N_3$-cyano-$N_1$-guanidino groups is preferably one in which the cyanoguanidino groups are attached to the end carbon atoms of an alkylene chain, but this is not essential. The alkylene chain can be an ethylene, propylene or higher alkylene chain, for example a pentamethylene, hexamethylene or decamethylene chain. The chain can be saturated or unsaturated, and can be substituted, for example by a hydroxyl group, or by an aryl group or an aliphatic group which can for example be an alkyl group or an alkoxy group; the alkyl group (and this also applies to the alkyl compound of the alkoxy group) can be acyclic (primary, secondary, or tertiary, and branched or unbranched), or cyclic, and can be a lower or higher alkyl group. Specific alkyl groups are those mentioned in the preceding paragraph. Suitable starting materials are exemplified by 1,3-di($N_3$-cyano-$N_1$-guanidino)propane and 1,6-di($N_3$-cyano-$N_1$-guanidino)hexane.

Examples of specific compounds according to the invention are:

1,6-di[$N_3$-(quinazoline-2-yl)-$N_1$-guanidino]hexane
1,3-di[$N_3$-(4-methylquinazolin-2-yl)-$N_1$-guanidino]propane
1,6-di[$N_3$-(4-methylquinazolin-2-yl)-$N_1$-guanidino]hexane
1,8-di[$N_3$-(4-ethylquinazolin-2-yl)-$N_1$-guanidino]octane
1,4-di[$N_3$-(4-methylquinazoline-2-yl)-$N_1$-guanidino]2,2,4-trimethylpentane
1,6-di[$N_3$-(6-ethyl-4-methylquinazolin-2-yl)-$N_1$-guanidino]hexane
1,6-di[$N_3$-(6-ethoxy-4-methylquinazolin-2-yl)-$N_1$-guanidino]hexane
1,6-di[$N_3$-(6-chloro-4-methylquinazolin-2-yl)$N_1$-guanidino]hexane
1,6-di[$N_3$-(8-hydroxy-4-methylquinazolin-2-yl)$N_1$-guanidino]hexane The process of the invention is carried out in a manner similar to that described in specifications Nos. 13,706/59 and 40,154/59. Equimolecular proportions of the two reactants are preferably used, and it is usually desirable to react these together in a solvent, which can be an aqueous solvent, or an organic solvent, for instance an alcohol. Mixture of water and organic solvents are sometimes useful. Ethanol or aqueous ethanol is often a convenient solvent.

The invention includes bacteriostatic compositions comprising a compound of the invention (or its salt) together with an inert diluent. The compositions can be liquid or solid ones and if liquid they can be solutions or dispersions (either suspensions or emulsions).

Salts of the compounds of the invention which are useful include the acid-addition salts formed by treating the free quinazoline with an acid, such as hydrochloric or hydrobromic acid, or for instance an organic acid such as acetic acid. Also suitable are the quaternary ammonium salts, such as the quaternary halides obtained by treating the free base with an alkyl halide. Cyclic quaternary ammonium halides can be obtained by treating the free base with an alkylene dihalide, and these also are valuable.

Bacteriostatic compositions of the invention which are suspensions can if desired be simple ones of the compound in an aqueous medium, stabilised if necessary by the presence of a surface-active agent, for instance a soap or a synthetic surface-active agent such as for example the sodium salt of a long-chain alkylated aromatic sulphonic acid. Alternatively, the compound can be dissolved in a suitable organic solvent and before use this solution can then be emulsified in an aqueous medium to give an emulsion of the invention; again this can be stabilised if necessary by a suitable surface-active agent. Such an emulsion is often particularly useful. The organic solvent is preferably immiscible with water, and can for instance be a hydrocarbon, such as for instance toluene, cyclohexane or petroleum ether, or some other organic liquid such as chloroform or chlorobenzene. Animal oils such as castor oil, olive oil, sperm oil, cottonseed oil or rape oil, or a mineral oil, are also very suitable. Emulsions can be of the "water-in-oil" type, or can be "oil-in-water." In general the suspensions and emulsions can be mobile or viscous, and can for example be in the form of a lotion, paste, cream or ointment.

Solutions according to the invention include aqueous salt solutions, or solutions in suitable organic solvents such as those described above. Solutions suitable for use in "aerosol" packages can be made if desired.

Compositions which are solids can for instance be those in which the inert diluent is a finely-divided powder such as for instance talc.

The proportions of the bacteriostat employed in the compositions will of course vary according to the nature of the compositions and the intended use. In general it is desirable to incorporate at least 0.5 or 1% by weight, but much larger amounts, for instance 10%, 25% or even 50% can be used, particularly if, as is commonly the case, the composition is a concentrated one intended to be diluted before use.

The compositions of the invention can be employed in any way which makes use of their bacteriostatic properties, for instance in the protection of a variety of materials, including cloth, leather or agricultural products (such as plants, vegetables and fruit) against bacteria and fungi. The invention therefore includes a method for inhibiting the growth of bacteria and fungi on a material which normally supports such growth, by treating the material with a compound having two $N_3$-(quinazolin-2-yl)-$N_1$-quanidino groups linked by an aliphatic residue.

Where one of the bacteriostats is used in soaps, these can be for instance common soap, as well as other soaps derived from natural oils, for example potassium soaps. Waxes in which the compounds can be used as bacteriostat can be for instance beeswax, carnauba wax and paraffin wax; wax polishes can also be employed. Synthetic plastics which are suitable include both thermoplastic resins, such as vinyl polymers and copolymers (for instance polystyrene, polyvinyl chloride and polyethylene), and thermosetting resins, for example phenol or melamine resins. In general the incorporation of from 0.05% to 5% by weight of the bacteriostat is sufficient.

Some of the compounds are also useful in rubber technology; for example 1,6-di[$N_3$-(6-ethoxy-4-methylquinazolin-2-yl) - $N_1$ - guanidino]hexane has antiozonant properties. The compounds of the invention, and especially the di[$N_3$-(quinazolin-2-yl)-$N_1$ - quanidino]alkanes are also useful chemical intermediates.

The invention is illustrated by the following examples.

*Example 1*

This example describes the preparation of the product believed to be 1,6-di[$N_3$-(4-methylquinazolin-2-yl)-$N_1$-guanidino]hexane from 1,6-di($N_3$-cyano-$N_1$-guanidino)-hexane and 2,2,4-trimethyl-1,2-dihydroquinoline. The example also demonstrates the bacteriostatic activity exhibited by this product.

6.8 grams of 2,2,4-trimethyl-1,2-dihydroquinoline and 5 grams of 1,6-di($N_3$-cyano-$N_1$-guanidino)hexane were dissolved in a mixture of 20 cc. of water, 20 cc. of ethanol and 4.5 cc. of concentrated hydrochloric acid (specific gravity 1.16), and the solution was boiled under reflux for 4 hours. Isobutylene was gradually evolved during the reaction. The reaction mixture was allowed to cool to room temperature and was poured on to a mixture of 200 grams of ice and 50 cc. of 2 N-sodium hydroxide solution, with stirring. 1,6-di[$N_3$-(4-methylquinazolin-2-yl)-$N_1$-guanidino]hexane was precipitated in the form of a brittle off-white solid. The product was filtered off and dried under reduced pressure for 24 hours at 30° C.

The minimum concentrations of 1,6-di-$N_3$-(4-methylquinazolin-2-yl)-$N_1$-guanidino hexane hydrochloride necessary to inhibit the growth of the bacteria known as *Staphylococcus aureus* and *Bacillus subtilis* were measured as follows. 0.5 cc. of a 1% solution of 1,6-di[$N_3$-(4 - methylquinazolin-2-yl)-$N_1$-guanidino]hexane hydrochloride was incorporated into 25 cc. of a warm Oxoid Nutrient Broth No. 2 agar in a test tube giving a concentration of 0.02% of the compound in the medium. The warm agar was immediately poured into a sterile petri dish and when hard it was streaked with a culture of the first of the test bacteria. A similar procedure was carried out in respect of the second test bacterium, and the two inoculated plates were incubated for 24 hours at 37° C., after which time they were examined for the presence or absence of growth of the organisms. If the bacteria failed to grow at this concentration (that is 0.02%) of 1,6-di[$N_3$-(4-methylquinazolin - 2 - yl)-$N_1$-guanidino]-hexane hydrochloride the test was repeated at a lower concentration until a concentration was reached at which the organisms were found to grow. In htis way there was found the minimum concentration capable of inhibiting growth of the particular strain of the organism used.

The minimum inhibiting concentration was found to be 0.001% for *Staphylococcus aureus* and 0.005% for *Bacillus subtilis*, which represents very good bacteriostatic activity.

*Example 2*

This example describes the preparation of 1,6-di-$N_3$-(6-ethoxy-4-methylquinazolin-2-yl)-$N_1$-guanidino hexane monohydrochloride from 6-ethoxy-2,2,4-trimethyl-1,2-dihydroquinoline hydrochloride and 1,6-di($N_3$-cyano-$N_1$-guanidino)hexane and also demonstrates its bacteriostatic activity.

The procedure described in Example 1 was repeated exactly with the exception that the 2,2,4-trimethyl-1,2-dihydroquinoline was replaced by 8.5 grams of 6-ethoxy-2,2,4-trimethyl-1,2-dihydroquinoline. The product consisted of a yellow brittle solid (melting point 110–120° C.). A sample was recrystallised from a small volume of alcohol, to yield yellow crystals (melting point 116–

118° C.). Found: C, 54.9; H, 6.55%. $C_{30}H_{41}N_{10}Cl$ requires C, 55.2; H, 6.5%.

The minimum inhibiting concentration of 1,6-di-$N_3$-(6-ethoxymethylquinazolin-2-yl)$N_1$-guanidino hexane hydrochloride was determined by the method described in Example 1 and found to be 0.002% for *Staphylococcus aureus* and 0.002% for *Bacillus subtilis*. This again represents very good bacteriostatic activity.

What I claim is:

1. A compound of the structure

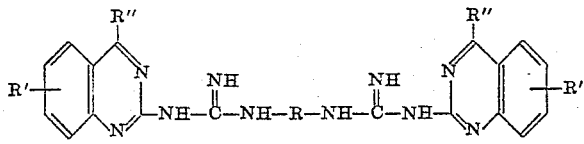

wherein R is alkylene having up to 12 carbon atoms; wherein R' is alkoxy having up to 12 carbon atoms; and wherein R" is alkyl having up to 12 carbon atoms.

2. A compound of the structure

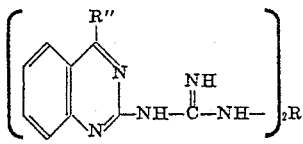

wherein R is alkylene having up to 12 carbon atoms; and wherein R" is alkyl having up to 12 carbon atoms.

3. A compound of the structure

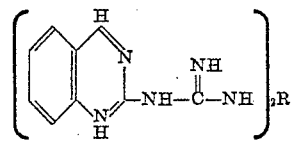

wherein R is alkylene having up to 12 carbon atoms.

4. 1,6-di[$N_3$-(quinazolin-2-yl)-$N_1$-guanidino]hexane.
5. 1,3-di[$N_3$-(4-methylquinazolin-2-yl)-$N_1$-guanidino]propane.
6. 1,6 - di[$N_3$ - (6-ethyl-4-methylquinazolin-2-yl)-$N_1$-guanidino]hexane.
7. 1,6 - di[$N_3$-(6-ethoxy-4-methylquinazolin-2-yl)-$N_1$-guanidino]hexane.
8. 1,6 - di[$N_3$ - (6-chloro-4-methylquinazolin-2-yl)-$N_1$-guanidino]hexane.

References Cited in the file of this patent

Brown: Chem. and Ind., p. 233, Feb. 27, 1960.